Oct. 19, 1954

R. L. HANSON 2,692,337

OSCILLATION GENERATOR

Filed Dec. 29, 1948

INVENTOR
R. L. HANSON
BY Harry C. Hart
ATTORNEY

Patented Oct. 19, 1954

2,692,337

UNITED STATES PATENT OFFICE 2,692,337

OSCILLATION GENERATOR

Robert L. Hanson, Summit, N. J., assignor to Bell Telephone Laboratories, Incorporated, New York, N. Y., a corporation of New York Application December 29, 1948, Serial No. 67,937

10 Claims. (Cl. 250—36)

This invention relates to signal translation networks utilizing semiconductor amplifiers as active elements.

The principal object of the invention is to generate electrical oscillations in a novel manner.

A related object is to provide an oscillation generator which shall be simple, rugged and compact, and which shall start to operate immediately it is switched into operating condition.

Another object is to provide an oscillation generator of improved frequency stability.

Application Serial No. 11,165 of John Bardeen and W. H. Brattain, filed February 26, 1948, abandoned after filing on January 17, 1948, by the same inventors of a continuation-in-part application, Serial No. 33,466, now Patent No. 2,524,035 dated October 3, 1950, describes and claims an amplifier unit of novel construction, comprising a small block of semiconductor material, such as N-type germanium, with which are associated three electrodes. One of these, known as the base electrode, makes low resistance contact with a face of the block. It may be a plated metal film. The others, termed emitter and collector, respectively, preferably make rectifier contact with the block. They may, in fact, be point contacts. The emitter is biased to conduct in the forward direction and the collector is biased to conduct in the reverse direction. "Forward" and "reverse" are here used in the sense in which they are understood in the rectifier art. When a signal source is connected between the emitter and the base and a load is connected in the collector circuit, it is found that an amplified replica of the voltage of the signal source appears across the load. The aforementioned application contains detailed specifications for the fabrication of the device.

The device may take various forms, all of which have properties which are generally similar although they differ in important secondary respects. Examples of such other forms are described and claimed in an application of J. N. Shive, Serial No. 44,241, filed August 14, 1948, and an application of W. E. Kock and R. L. Wallace, Jr., Serial No. 45,023, filed August 19, 1948, now Patent No. 2,560,579, dated July 17, 1951. The device in all of its forms has received the appellation "Transistor," and will be so designated in the present specification.

In the earlier Bardeen-Brattain application above referred to, there appears a tabulation of the performance characteristics of three sample transistors. In one of these, it appears that increments of signal current which flow in the circuit of the collector electrode as a result of the signal current increments which flow in the circuit of the emitter electrode exceed the latter in magnitude. This current amplification feature of transistors has become the general rule, and appears in nearly all transistors fabricated. It is discussed in detail in the aforementioned continuation-in-part application of John Bardeen and W. H. Brattain, Serial No. 33,466, filed June 17, 1948, and issued on October 3, 1950, as Patent 2,524,035. It is of such importance in connection with the present invention, as well as others, that the ratio of these increments has been given a name, "$\alpha$." In the present invention, the presence of such a current gain factor, not heretofore available in conventional vacuum tube amplifiers, is turned to account in the construction of a self-oscillation circuit or oscillation generator of novel configuration.

In the case of a transistor amplifier whose external circuit is of the so-called "grounded base" configuration; (the configuration in which the emitter and the base serve as the input terminals and the collector and the base serve as the output terminals) the collector (output) current is in phase with the emitter (input) current. As long as the collector current exceeds the emitter current in magnitude, a fraction of the collector current equal to the emitter current may be fed back to the emitter, the balance being supplied to a useful load. Operation then continues even though all other signal frequency sources of emitter current be removed. That is to say, self-oscillation takes place. Because of the phase identity above referred to, this feedback may be effected by simple means, for example, by a current path connecting the collector to the emitter and including a frequency-determining element such as a series-resonant circuit or the equivalent. In its simplest form, this circuit comprises a coil and a condenser connected in series. Alternatively, it may comprise a more complex element, such as a piezoelectric transducer having similar characteristics.

At the desired oscillation frequency, to which this circuit is tuned, its impedance comprises merely the residual resistance of the feedback path, which may in actual practice be so low as to be wholly negligible. Hence the feedback is strong at this frequency. On the other hand, at frequencies higher and lower than the resonant frequency, the feedback is greatly reduced, both because the magnitude of the impedance of the tuned circuit is greater at frequencies off resonance than at the resonant frequency, and because it introduces a phase shift such that the in-phase component of the current fed back, which is the only one tending to maintain self-oscillation, is still further reduced. Thus, self-oscillation is maintained at the frequency to which the frequency-determining element is tuned, and at no other.

Broadly speaking, the same considerations hold for an oscillation generator based on a transistor amplifier of the grounded collector circuit configuration or, indeed, for any circuit configuration characterized by phase coincidence between output (collector) current and input (emitter) current, utilizing a transistor whose current gain factor is greater than unity.

In the case of all oscillation generators in which a conventional vacuum tube is the active element, either there is a phase reversal between input terminals and output terminals, in which case a parallel or antiresonant circuit must be employed as the frequency-determining element in the feedback path, or the output current is just equal to the input current, in which case the absorption of any power by the load, or even by miscellaneous resistive elements of the oscillator circuit itself, results in the rapid extinction of the self-oscillations. But with the present invention neither of these difficulties obtains, and the series-resonant feedback circuit may be employed with many consequent advantages.

One such advantage is improved frequency stability. The frequency at which the system oscillates is that at which the feed-back path introduces no phase shift, i. e., its impedance is purely resistive. With a series resonant circuit, this frequency is that at which its inductive reactance is exactly balanced by its capacitive reactance. It is independent of the magnitudes of residual resistances in the circuit. Thus if, for example, a temperature change were to alter the resistance of the coil, the oscillation frequency would not change. The contrary is true of an oscillation generator which, like any of the conventional ones, utilizes an antiresonant network in the feedback path. In such case the corresponding frequency depends in a known way on the residual network resistance, so that a temperature change of the coil results in a change of the self-oscillation frequency of the generator. This condition is well known and has necessitated the development of various artificial means for holding constant the generated frequency, either by preventing resistance changes from occurring, by balancing them out in accordance with bridge techniques, or otherwise. By the present invention such expedients are rendered unnecessary. It thus furnishes an oscillation generator of inherent frequency stability.

The invention will be fully apprehended from the following detailed description of certain preferred embodiments thereof, taken in connection with the appended drawings, in which.

Figure 1:
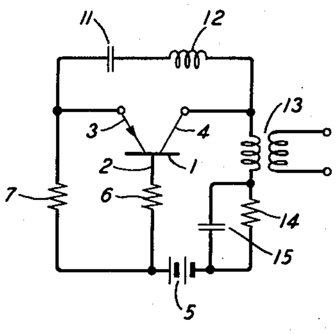
Fig. 1 is a schematic circuit diagram of a transistor oscillator embodying the invention.

Referring now to the drawings, Fig. 1 shows a transistor amplifier comprising a block 1 of semiconductive material such as N-type germanium, provided with a low resistance base electrode 2, a point contact emitter electrode 3 and another point contact collector electrode 4. Operating bias for the collector is supplied by a battery 5, connected between the base 2 and the collector 4. Operating bias is supplied to the emitter 3 by the nearly balanced voltage drops across resistors 6 and 7, connected to the base 2 and the emitter 3, respectively, as described in an application of H. L. Barney, Serial No. 49,951, filed September 18, 1948, now abandoned, and in a continuation-in-part application of the same inventor, Serial No. 123,507, filed October 25, 1949, issued as Patent No. 2,647,958, dated August 4, 1953, which supersedes the earlier application.

The base resistor 6 is chosen to maintain the proper bias conditions between the emitter and base. Specifically, for a transistor of N-type germanium the emitter potential should be of the order of 0.2 volt positive relative to the base.

The present invention is concerned with the addition, between the collector 4 and the emitter 3, of a feedback coupling tuned circuit made up of a condenser 11 and an inductive coil 12. The load impedance is shown in the form of an output transformer 13, the primary winding of which is connected in series with a resistance element 14 shunted by a condenser 15. The condenser 15 presents a low impedance to alternating currents and thus leaves the transformer 13 as substantially the only impedance for these currents. The resistance element 14 in combination with the resistance 7 in the emitter circuit serves as a safeguard to prevent the flow of excessive direct current through the transistor. Without this protection the negative resistance characteristic of the transistor, discussed in an application of H. L. Barney, Serial No. 58,685, filed November 6, 1949, and issued February 12, 1952, as Patent No. 2,585,078 might permit the gradual increase of the direct current until damaging values are attained.

The operation of the circuit as a generator of single frequency oscillations is as follows. Any electrical disturbance at the emitter 3, such as that resulting from connecting the battery 5 into the circuit, or from thermal voltages in the emitter resistance, is amplified by the transistor and appears on the collector 4 as amplified versions of the emitter voltage. This voltage can drive currents back to the emitter through two paths, the first through the load impedance 13 and the emitter resistance 7, and the second through the series LC circuit. The impedances in the first path are of such magnitudes that the resulting voltage at the emitter is normally less than that which started the process. The same thing is true of the LC path for all frequencies except that for which the inductive reactance of the coil 12 is just balanced by the capacitive reactance of the condenser 11; i. e. for $$f=\frac{1}{2\pi\sqrt{LC}}$$

For this frequency the impedance is only that of the residual resistance of the back-coupling path, and the resulting current produces a voltage on the emitter which is greater than that of the original disturbance and which is in phase with it. Voltages of frequencies other than $$f=\frac{1}{2\pi\sqrt{LC}}$$

will be smaller because of the higher impedance of the circuit and will be out of phase with the original disturbance. The new emitter voltage of frequency $f$ is amplified by the transistor and produces a still higher voltage on the collector. This drives still more current through the LC feedback path. This process grows until a steady-state condition is reached at which the non-linear characteristic of the transistor amplifier causes the voltage gain to just match the voltage loss through the feedback circuit. In this steady-state condition a part of the collector current flows back through the tuned circuit 11, 12, to the emitter and maintains the oscillations, while the rest flows through the output transformer 13 to produce useful power.

Figure 2:
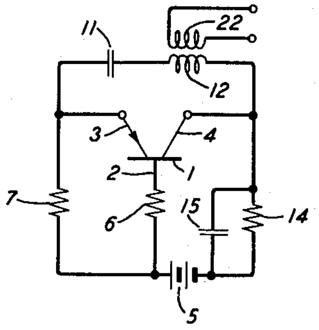
Fig. 2 is a schematic circuit diagram of an alternative to Fig. 1.

Fig. 2 illustrates one variant in which the output is taken from a secondary winding 22 coupled to the inductance of the tuning coil 12 of the feedback path. The magnitude of the emitter resistor 7 is such that loss through it and the collector resistance 14 is too great to permit oscillations. The base resistor 6 is chosen to maintain the proper bias conditions between the emitter and base. Specifically, for a transistor of N-type germanium the emitter potential should be of the order of 0.2 volt positive relative to the base.

Figure 3:
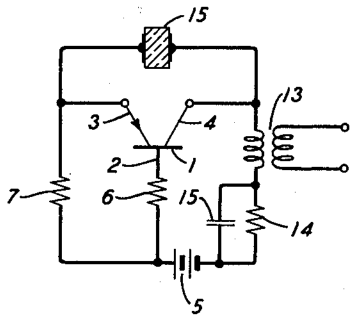
Fig. 3 is a schematic diagram of another alternative to Fig. 1.

Fig. 3 illustrates the same circuit as that of of Fig. 1 except that the feedback from the collector 4 to the emitter 3 is by way of a piezoelectric transducer. The characteristic of such a transducer at resonance is the same as that of a series-tuned circuit; i. e., an inductance in series with a condenser. Thus, at one frequency only the impedance through the transducer 15 is low and the current is passed without change in phase. The operation of the transducer 15 is therefore substantially identical to that of the feedback circuit illustrated in Fig. 1.

As is well known, no self-oscillating system increases in amplitude indefinitely. Rather, the amplitude of oscillation becomes stabilized at some definite level. Because of inherent second order nonlinearities, the gain of every amplifier falls off somewhat as its power output increases and so, when the amplifier forms a part of a feedback loop of a self-oscillator, the power fed back from output to input falls off likewise. The stable level of oscillation amplitude is that at which the energy fed back from the output is exactly equal to energy required at the input.

The same second order nonlinearities provide the basis for the synchronization of the self-oscillator with an external source, to which end a periodic synchronizing signal may be introduced into the self-oscillating circuit at a suitable point.

The present oscillator is no exception.

The above-described arrangements are illustrative of the application of the principles of the invention. Numerous other arrangements may be devised by those skilled in the art without departing from its spirit.

What is claimed is:

1. An oscillation generator which comprises a transistor comprising a semiconductive body, a base electrode, an emitter electrode and a collector electrode cooperatively associated therewith, said transistor being characterized by a ratio of short-circuit collector current increments to emitter current increments which under proper conditions of electrode bias is greater than unity, means including an energy source for establishing said proper bias conditions, a first impedance element interconnecting the emitter with a ground point, a second impedance element interconnecting the collector with said ground point, a third impedance element interconnecting the base with said ground point, and a feedback path directly connecting said collector to said emitter, said path including reactive elements connected in series.

2. An oscillation generator which comprises a transistor comprising a semiconductive body, a base electrode, an emitter electrode and a collector electrode cooperatively associated therewith, said transistor being characterized by a ratio of short-circuit collector current increments to emitter current increments which, under proper conditions of electrode bias is greater than unity, an energy source for establishing proper collector bias conditions having one terminal connected to the collector, a resistor in series with the emitter, another resistor in series with the base, the junction point of said resistors being connected to the other terminal of said source, the magnitudes of said resistors being such as to establish suitable bias conditions for the emitter, and a feedback path directly connecting said collector to said emitter, said path including reactive elements connected in series.

3. An oscillation generator which comprises a current multiplication transistor having an emitter electrode, a collector electrode, and a base electrode, means including an energy source for establishing biases on said electrodes favorable to current multiplication, a first element of relatively high impedance at a desired frequency interconnecting the emitter with a ground point, a second element of relatively high impedance at said frequency interconnecting the collector with said ground point, a third element of relatively high impedance interconnecting the base with said ground point, and a current feedback path of relatively low impedance at said frequency interconnecting the collector with the emitter, said path including a series combination of a condenser and a coil which are resonant at said frequency.

4. An oscillation generator which comprises a current-multiplication transistor comprising a semiconducting body, a base electrode, an emitter electrode and a collector electrode in contact with said body, means for applying a reverse bias between said collector and base electrodes and for applying a forward bias between said emitter and base electrodes, an impedance element connected between said base electrode and a fixed potential point, and a current feedback path directly interconnecting said collector electrode with said emitter electrode, said feedback path including means for restricting feedback currents traversing said path to a desired frequency.

5. The combination defined in claim 4 wherein said current restricting means includes reactive elements connected in series.

6. The combination defined in claim 4 wherein said current restricting means has a low impedance at a preassigned frequency and higher impedance at both higher and lower frequencies.

7. The combination defined in claim 4 wherein said current restricting means comprises a series resonant circuit.

8. The combination defined in claim 4 wherein said current restricting means comprises an inductance coil and a condenser connected in series.

9. In combination with the apparatus defined in claim 8, an output winding inductively coupled to said coil.

10. The combination defined in claim 4 wherein said current restricting means comprises a piezoelectric element.

References Cited in the file of this patent

UNITED STATES PATENTS

| Number | Name | Date |
|---|---|---|
| 1,789,496 | Pierce | Jan. 20, 1931 |
| 1,833,966 | Fetter | Dec. 1, 1931 |
| 1,934,212 | Franklin | Nov. 7, 1933 |
| 2,163,403 | Meacham | June 20, 1939 |
| 2,332,102 | Mason | Oct. 19, 1943 |
| 2,524,035 | Bardeen et al. | Oct. 3, 1950 |